Jan. 16, 1962   J. Z. DE LOREAN   3,016,768
SPLIT TORQUE TRANSMISSION
Filed July 31, 1958
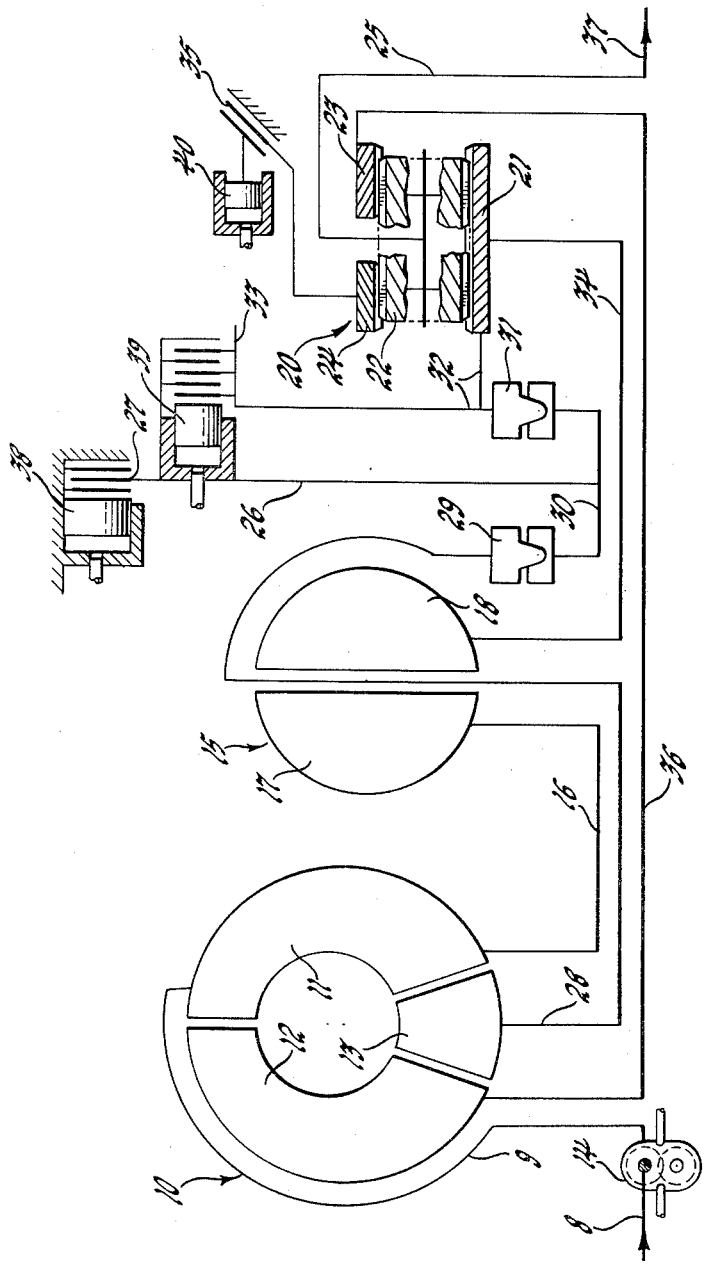
INVENTOR.
John Z. DeLorean
BY
R. L. Spencer
ATTORNEY

United States Patent Office 3,016,768
Patented Jan. 16, 1962

3,016,768
SPLIT TORQUE TRANSMISSION
John Z. De Lorean, Birmingham, Mich., assignor to General Motors Corporation, Detroit, Mich., a corporation of Delaware
Filed July 31, 1958, Ser. No. 752,336
9 Claims. (Cl. 74—677)

This invention relates to transmissions and particularly to transmissions of the type incorporating a hydrodynamic torque converter and planetary gearing unit.

In conventional transmissions incorporating torque converters and planetary gearing, the drive of the vehicle in all gear rations of the gear unit is usually from the converter to the output shaft through the gear unit. Such arrangements are relatively expensive to operate due to the inefficiency of the torque converter even when operating in direct drive. The transmission arrangement of this invention incorporates a direct drive wherein part of the torque in direct drive is transmitted through the converter and part is transmitted independently of the converter for a highly efficient direct drive operation. At the same time, the torque multiplication of the converter may be available at a time when torque is being applied to the gear unit independently of the torque converter.

An object of this invention is to provide a transmission incorporating a hydrodynamic torque converter and planetary gearing unit wherein all torque is transmitted to the gearing unit through the converter when the gear unit is operating in reduction drive and wherein part of the torque is transmitted from the converter to the gear unit and part of the torque is transmitted to the gear unit independently of the converter when the gear unit is operated in direct drive.

An additional object of this invention is to provide a torque converter and gearing combination wherein a hydrodynamic torque converter may be controlled to provide either forward drive or reverse drive of an output shaft through a single planetary gearing unit.

A further object of this invention is to provide a torque converter and planetary gearing unit having control elements including brakes and a fluid coupling capable of providing efficient hydrodynamic braking when the output shaft tends to overrun the input shaft.

These and other objects and advantages of the invention will be apparent from the following description and claims taken in conjunction with the accompanying drawing in which:

The single figure is a schematic diagram of a transmission incorporating the principles of this invention.

Referring to the drawing, there is shown a transmission incorporating the principles of this invention including a torque converter unit indicated generally at 10, a drive ratio control coupling 15 and a planetary gearing unit 20. Converter 10 includes an impeller 11, a turbine 12 and a reaction member 13. An engine driven drive shaft 8 is connected to rotate impeller 11 through a drive connection 9. A pump 14 may be driven by shaft 8 to supply fluid under pressure for transmission control purposes. Fluid coupling unit 15 includes an impeller 17 connected for rotation with turbine impeller 11 by a drive connection 16, and a turbine 18. Drive shaft 8, impeller 11 and impeller 17 all rotate as a unit. Planetary gear unit 20 includes a planet carrier 25 fixed to an output shaft 37 which may drive the vehicle wheels, not shown, through a conventional differential gear unit, not shown, the carrier 25 having a planet pinion gear 22 journalled therein and in mesh with a sun gear 21 and a pair of ring gears 23 and 24. A housing member 26 carries an engageable and releasable brake 27 adapted to prevent rotation of housing 26 when engaged and to permit rotation of housing 26 when released. A one-way brake 29 cooperates with a flange 30 on housing 26 and a ground connection 28 from converter reaction member 13 to prevent reverse rotation of reaction member 13 and to permit forward rotation of member 13 when brake 27 is engaged. Ground connection 28 extends outwardly through coupling 15 between impeller 17 and turbine 18 and then extends inwardly around turbine 18 between the turbine 18 and housing 26 to one-way brake 29. A second one-way brake 31 is disposed between flange 30 and sun gear 21 to prevent reverse rotation of sun gear 21 and to permit forward rotation of the sun gear when brake 27 is engaged.

An extension 32 on sun gear 21 carries an engageable and releasable clutch 33 which may be engaged to connect the sun gear 21 in a non-rotatable relationship to housing 26. Turbine 18 is connected in a non-rotatable relationship to sun gear 21 by a connection 34 so that the turbine and sun gear rotate as a unit. An engageable and releasable brake 35 may be engaged to prevent rotation of ring gears 24 and 23. Turbine 12 is connected to ring gear 23 by a drive connection 36 such that turbine 12 and ring gear 23 rotate as a unit. Control of the admission of fluid to and exhaust of fluid from drive ratio control coupling 15 may be as in conventional through a valve, not shown, controlled in response to vehicle speed and engine torque demand. At low vehicle speeds coupling 15 will be empty. At other vehicle speeds it will be full of working fluid.

*Operation—neutral*

To provide for a positive neutral condition of operation, brakes 27, 35 and clutch 33 are released. Fluid coupling 15 will be empty of working fluid when the vehicle is standing still. Assuming the engine to be running to rotate impeller 11, forward rotation of turbine 12 by circulating working fluid in the converter will cause forward rotation of ring gear 23 through drive connection 36. Due to the load of the vehicle on carrier 25, the carrier will remain stationary. Rotation of ring gear 23 will therefore cause pinion gear 22 to spin forwardly in the carrier and drive sun gear 21 in reverse. Torque converter reaction member 13 and housing 26 will spin freely in reverse. Since there is no reaction point in gear unit 20, no torque can be transmitted through the gear unit and a positive neutral condition of operation is obtained.

*Forward—low range*

To start the vehicle in motion, forward brake 27 is engaged to prevent rotation of housing 26. With brake 27 engaged, one-way brake 29 is effective to prevent reverse rotation of reaction member 13 and one-way brake 31 is effective to prevent reverse rotation of sun gear 21. Assuming the impeller 11 is rotating forwardly at a sufficient speed to rotate turbine 12 and ring gear 23 forwardly, the converter reaction member 13 and sun gear 21 will tend to spin reversely. One-way brake 29 prevents reverse rotation of member 13 by grounding member 13 to flange 30 of housing 26. One-way brake 31 prevents reverse rotation of sun gear 21 by grounding the sun gear to flange 30 of housing 26. Forward rotation of ring gear 23 therefore causes pinion gear 22 to walk around sun gear 21 pulling carrier 25 in a forward direction in reduction drive. The carrier 25 and output shaft 37 fixed thereto are driven through the torque multiplication of the converter and that of the gear unit. The drive in low range is through the converter turbine 12 to the gear unit 20, and provides a hydrodynamic torque multiplication plus gear unit torque multiplication. In low range, fluid coupling 15 is empty of working fluid and all torque is transmitted through converter turbine 12 to the gear unit.

Forward-high range

Assuming the vehicle is speeded up in reduction drive, at some vehicle espeed, a fluid coupling control valve, not shown, will be positioned to admit working fluid to coupling 15. With coupling 15 filled with working fluid, impeller 17 will be effective to drive turbine 18 and sun gear 21 forwardly at substantially engine shaft speed. At this time, impeller 11 is also effective to drive turbine 12 and ring gear 23 forward at substantially engine shaft speed. Gear unit 20 is in effect locked up in direct drive so that carrier 25 and output shaft 37 are driven forwardly at substantially engine shaft speed. In high or direct forward drive operation, the converter turbine one-way brake 29 may prevent reverse rotation of reaction member 13 in the event that a load is placed on the turbine 12 tending to slow down the turbine. Thus, torque multiplication may be had in the converter even though the fluid coupling 15 is filled with fluid to lock up the gear unit in direct drive. In direct drive, part of the torque is applied to the gear unit through the converter and part through the coupling. This split torque drive is highly efficient and reduces fuel consumption over that obtained in arrangements wherein all drive is accomplished through the torque converter.

Coast braking

It will be noted that in the description so far set forth, it is assumed that torque is being applied by the engine to the output shaft 37. It will be noted that in the event the vehicle overruns the engine, as would occur in coming to a stop or in descending a hill, little engine braking would be had. To provide for substantial braking of the vehicle on overrun, clutch 33 may be engaged to lock sun gear 21 to housing member 26. With brake 33 released, one-way brake 31 permits free forward rotation of sun gear 21 when the vehicle cverruns the engine. With brake 33 engaged, sun gear 21 and turbine 18 are locked to housing 26. Since brake 27 is also engaged, the sun gear 21 and turbine 18 are held against rotation. This causes a downshift of drive ratio in gear unit 21 from direct to reduction, but due to the fact that carrier 25 is now the driving element or power input member to the gear unit, ring gear 23 and turbine 12 are driven at overspeed. Turbine 12 now tends to drive impeller 11 (the engine throttle being relaxed) to speed up the engine. At the same time impeller 11 tends to drive impeller 17 at overspeed setting up a highly effective hydraulic turbulence in coupling 15 due to the fact that turbine 18 is held against rotation. There is thus provided an efficient hydrodynamic braking of the vehicle which is particularly useful in hilly country.

Reverse

For reverse drive, forward brake 27 is released and reverse brake 35 and clutch 33 are engaged. Application of brake 35 prevents rotation of ring gear 24, ring gear 23, and turbine 12. With turbine 12 held against rotation, the turbine 12 functions as the reaction member of the converter. Reaction member 13 now becomes the power delivery member of the converter and drives housing 26 and sun gear 21 in reverse. Planet gears 22 walk around the fixed ring gears 23 and 24 driving carrier 25 and shaft 37 in reduction drive in reverse.

Control of release and application of brake 27, clutch 33, and reverse brake 35 may be through a manually operated valve, not shown, which may be positioned to direct fluid under pressure to servo pistons 38, 39 and 40 as desired.

It will readily be understood that when operating in high range or direct drive with the fluid coupling filled with working fluid, part of the torque is transmitted to gear unit 20 through coupling 15 and part through converter 10. Thus the advantages and economics of a split torque drive are obtained while still maintaining the torque converter in the drive train. The hydrodynamic reverse arrangement wherein member 13 serves as a turbine rather than a reaction member in reverse drive makes possible the use of a relatively simple planetary gear set without the necessity of providing additional reverse gearing. The coast braking arrangement including clutch 33 is of great advantage when operating in hilly country. The transmission herein provided is of a simple and economical construction and includes the advantage of split torque high range drive for maximum economy of operation, hydrodynamic reverse, and hydrodynamic overrun braking.

I claim:

1. A transmission comprising in combination, a three element hydrodynamic torque converter unit, a fluid coupling unit and a planetary gearing unit, said torque converter comprising an impeller, a turbine and a reaction member, said fluid coupling unit being of the type adapted to be alternately filled with and emptied of working fluid and including an impeller and a turbine, a drive shaft connected to both of said impellers for rotating said impellers in unison, said planetary gearing unit including a planet carrier having a planet pinion gear journalled therein and in mesh with a sun gear and first and second ring gears, a final power output shaft fixed for rotation with said planet carrier, a drive connection directly connecting said converter turbine to said first ring gear for rotation therewith as a unit, a drive connection between said fluid coupling turbine and said sun gear, a rotatable housing, engageable and releasable brake means effective when engaged to prevent rotation of said housing, one-way brake means for preventing reverse rotation of said converter reaction member with respect to said housing, one-way brake means for preventing reverse rotation of said sun gear with respect to said housing, said torque converter turbine constituting the sole power input member to said gear unit when said fluid coupling is empty of working fluid, and said torque converter turbine and said fluid coupling turbine each constituting a power input member for transmitting torque to said gear unit when said fluid coupling is filled with working fluid.

2. A transmission comprising in combination, a three element hydrodynamic torque converter and a planetary gearing unit, said torque converter comprising an impeller, a turbine and a reaction member, means for controlling drive through said gearing unit including a plurality of engageable and releasable members and a fluid coupling unit of the type adapted to be alternately filled with and emptied of working fluid, said fluid coupling unit including an impeller and a turbine, a drive shaft connected to said impellers for rotating said impellers in unison, said planetary gearing unit including a planet carrier having a planet pinion gear journalled therein and in mesh with a sun gear and first and second ring gears, a final power output shaft fixed for rotation with said planet carrier, means directly connecting said torque converter turbine to said first ring gear for rotation therewith, means connecting said fluid coupling turbine to said sun gear for rotation therewith, a rotatable housing, an engageable and releasable brake effective when engaged to prevent rotation of said housing, a one-way brake for preventing reverse rotation of said torque converter reaction member and for permitting forward rotation thereof effective when engaged to connect said reaction member to said housing, an additional one-way brake for preventing reverse rotation of said sun gear and to permit forward rotation thereof effective when engaged to connect said sun gear to said housing, said torque converter turbine constituting the sole power input member for driving said gear unit in forward drive when said fluid coupling is empty of working fluid, said torque converter turbine and said fluid coupling turbine each constituting a power input for driving said gear unit in forward drive when said fluid coupling is filled with working fluid.

3. A power transmission comprising in combination, a three element hydrodynamic torque converter and a planetary gearing unit, said torque converter comprising an impeller, a turbine and a reaction member, said gearing unit including a planet carrier directly connected to a final power output shaft for rotation therewith, said carrier having a planet pinion journalled therein and in mesh with a sun gear and a ring gear, a rotatable housing a connection between said converter reaction member and said housing including a one-way brake for preventing reverse rotation of said reaction member with respect to said housing and for permitting free forward rotation of said reaction member, means directly connecting said converter turbine to said ring gear, a fluid coupling of the type adapted to be alternately filled with and emptied of working fluid having an impeller and a turbine, means connecting said coupling turbine to said sun gear for rotation as a unit, a one-way brake between said sun gear and said rotatable housing for preventing reverse rotation of said sun gear with respect to said housing and for permitting free forward rotation of said sun gear, an engageable and releasable forward brake effective when released to permit free rotation of said housing to establish neutral condition of transmission operation and effective when engaged to prevent rotation of said housing to establish forward drive of said output shaft, said torque converter turbine being effective to drive said planet carrier through the reduction drive ratio of said gear unit when said forward brake is engaged and said fluid coupling is empty, said fluid coupling turbine and said converter turbine being effective in combination to provide direct drive of said planet carrier when said forward brake is engaged and said coupling is filled with working fluid, and engageable and releasable means effective when engaged to connect said sun gear and fluid coupling turbine to said housing to downshift said gear unit to reduction drive and to provide hydrodynamic braking of the output shaft when the output shaft tends to overrun said drive shaft.

4. A power transmission comprising, in combination, a three element hydrodynamic torque converter and a planetary gearing unit, said torque converter comprising an impeller, a turbine and a reaction member, said planetary gearing unit including a planet carrier directly connected to a final output shaft, said carrier having a pinion gear journalled therein and in mesh with a sun gear and first and second ring gears, a rotatable housing, a connection between said converter reaction member and said housing including a one-way brake for preventing reverse rotation of said reaction member with respect to said housing and for permitting forward rotation of said reaction member with respect to said housing, means directly connecting said converter turbine to said first ring gear for rotation therewith, a fluid coupling of the type adapted to be alternately filled with and emptied of working fluid having an impeller and a turbine, a drive shaft connected to both of said impellers for rotating the same, means connecting said coupling turbine to said sun gear for rotation therewith, a one-way brake between said sun gear and said rotatable housing for preventing reverse rotation of said sun gear with respect to said housing and for permitting forward rotation of said sun gear, an engageable and releasable forward brake effective when released to permit free rotation of said housing to establish neutral condition of transmission operation and effective when engaged to prevent rotation of said housing to establish forward drive of said planet carrier, said converter turbine being effective to drive said carrier in reduction drive through said gear unit when said forward brake is applied and said fluid coupling is empty of working fluid, said converter turbine and fluid coupling turbine being effective in combination to drive said planet carrier in direct drive through said gearing unit when said forward brake is engaged and said fluid coupling is filled with working fluid, and an engageable and releasable reverse brake associated with said second ring gear effective when engaged to prevent rotation of said torque converter turbine, said torque converter reaction member being effective when said reverse brake is engaged and said forward brake is released to drive said planet carrier in reverse.

5. A power transmission comprising in combination, a three element hydrodynamic torque converter and a planetary gearing unit, said converter having an impeller, a turbine and a reaction member, said planetary gearing unit including a planet carrier fixed to a final output shaft and supporting a pinion gear in mesh with a sun gear and first and second ring gears, means directly connecting said converter turbine to said first ring gear for rotation therewith, a rotatable housing, means including a one-way brake for preventing reverse rotation of said turbine reaction member with respect to said housing, a one-way brake between said sun gear and said housing, an engageable and releasable forward brake effective when engaged to prevent rotation of said housing, an engageable and releasable friction member effective when engaged to clutch said sun gear to said housing, a fluid coupling of the type adapted to be alternately filled with and emptied of working fluid having an impeller and a turbine, a drive connection between a drive shaft and both of said impellers, means connecting said fluid coupling turbine to said sun gear, and a reverse brake effective when engaged to prevent rotation of said second ring gear and said torque converter turbine, said one-way brakes being effective when said forward brake is engaged and said coupling is empty of fluid to prevent reverse rotation of said converter reaction member and said sun gear to establish reduction drive through said converter and gearing, said fluid coupling being effective when filled with working fluid and said friction member is released to establish forward direct drive of said sun gear, said friction member being effective when engaged in conjunction with engagement of said forward brake to downshift the gear unit and to prevent rotation of said coupling turbine to establish hydrodynamic braking of said coupling turbine to establish hydrodynamic braking of said output shaft when said coupling is filled with working fluid, said reverse brake being effective when engaged in conjunction with release of said forward brake to prevent rotation of said converter turbine and said ring gears to establish reverse drive of said carrier by said converter reaction member, said friction member being engageable in conjunction with engagement of said reverse brake to lock said sun gear to said rotatable housing to by-pass the one-way clutch between the sun gear and the rotatable housing.

6. A power transmission comprising in combination, a three element hydrodynamic torque converter and a planetary gearing unit, said torque converter including an impeller, a turbine and a reaction member, said planetary gearing unit including a planet carrier directly connected to a final output shaft, said carrier having a pinion gear journalled therein and in mesh with a sun gear and ring gear, a rotatable housing, an engageable and releasable brake effective when engaged to prevent rotation of said housing, a connection between said reaction member and said housing including a one-way brake for preventing reverse rotation of said reaction member with respect to said housing and for permitting forward rotation of said reaction member with respect to said housing, means directly connecting said torque converter turbine to said ring gear for rotating the same, a fluid coupling of the type adapted to be alternately filled with and emptied of working fluid having an impeller and a turbine, a drive shaft connected to said impellers for rotating the same, means forming a drive connection between said fluid coupling turbine and said sun gear, a one-way brake between said sun gear and said housing for preventing reverse rotation of said sun gear with respect to said housing and for permitting forward rotation of said sun gear with respect to said housing, said torque converter turbine constituting the sole power input for said gear unit when said fluid coupling is empty of working fluid and being effective to drive said gear unit ring gear for forward drive of said planet carrier with maximum torque multiplication when said engageable and releasable brake is applied to prevent rotation of said rotatable housing, said fluid coupling turbine being effective when said fluid coupling is filled with working fluid to drive said gear unit sun gear in a forward direction, said fluid coupling turbine and said converter turbine cooperating to provide substantially a direct drive of said planet carrier through said gear unit when said fluid coupling is filled with working fluid.

7. In combination in a transmission, a three element hydrodynamic torque converter unit, a fluid coupling unit of the type adapted to be alternately filled with and emptied of working fluid, a planetary gearing unit, said torque converter including an impeller driven by an engine driven drive shaft, a turbine, and a reaction member, said fluid coupling unit including an impeller driven by said drive shaft and a turbine, said gearing unit including a planet carrier fixed for rotation with a final output shaft and supporting a planet pinion gear in mesh with a sun gear and first and second ring gears, a rotatable housing member, means for preventing reverse rotation of said converter reaction member with respect to said housing member including a one-way brake, means for preventing reverse rotation of said sun gear with respect to said housing member including a one-way brake, an engageable and releasable brake associated with said housing member effective when released to permit free rotation of said housing member to establish neutral condition of transmission operation and effective when engaged to prevent rotation of said housing member to establish forward drive condition of transmission operation, means directly connecting said converter turbine to said first ring gear for rotation as a unit, means connecting said fluid coupling turbine to said sun gear for rotation as a unit, said fluid coupling turbine being effective to drive said sun gear to establish direct drive of said gear unit in cooperation with drive of said first ring gear by said converter turbine when said fluid coupling is filled with working fluid, said second mentioned one-way brake being effective to prevent reverse rotation of said sun gear with respect to said housing when said fluid coupling is emptied of working fluid.

8. In combination in a transmission for transmitting torque from an engine driven shaft to a final power delivery shaft, a three element hydrodynamic torque converter unit having an impeller driven by said engine driven shaft, a turbine and a reaction member; a fluid coupling unit of the type adapted to be alternately filled with and emptied of working fluid and having an impeller driven by said engine driven shaft and a turbine, a planetary gearing unit having a planet carrier fixed to said final power delivery shaft and supporting a planet pinion in mesh with a sun gear and a pair of ring gears, a drive connection directly connecting said converter turbine to one of said pair of ring gears, a drive connection between said fluid coupling turbine and said sun gear, a rotatable housing, an engageable and releasable brake effective when engaged to prevent rotation of said housing, means including a one-way brake for preventing reverse rotation of said converter reaction member with respect to said housing, means including a one-way brake for preventing reverse rotation of said sun gear with respect to said housing, said first-mentioned brake being effective when engaged and said fluid coupling is empty to establish reduction forward drive through said gear unit, said fluid coupling turbine being effective when said fluid coupling is filled with working fluid to drive said sun gear to establish direct drive in said gear unit, an engageable and releasable two-way clutch effective when engaged to clutch said sun gear to said housing to prevent rotation of said sun gear and fluid coupling turbine with respect to said housing, and an additional engageable and releasable brake effective when engaged to prevent rotation of both of said ring gears and said converter turbine, said converter reaction member being effective when said last-mentioned brake is engaged to drive said rotatable housing and said sun gear to establish reverse drive of said planet carrier.

9. In combination in a transmission for transmitting torque from an engine driven shaft to a final power delivery shaft, a three element hydrodynamic torque converter unit comprising an impeller, a turbine and a reaction member, a fluid coupling unit of the type adapted to be alternately filled with and emptied of working fluid, said coupling comprising an impeller directly connected for rotation with said converter impeller and a turbine, a planetary gearing unit comprising a planet carrier directly connected to said power delivery shaft for rotation therewith as a unit and supporting a plurality of planet pinions in mesh with a sun gear and a ring gear, a shaft directly connecting said converter turbine to said ring gear for rotation therewith as a unit, a sleeve shaft directly connecting said coupling turbine to said sun gear for rotation therewith as a unit, a rotatable housing supported for rotation on said sleeve shaft, an extension on said sun gear fixed to said sun gear for rotation therewith as a unit, a ground member fixed to said converter reaction member for rotation therewith, said ground member including a sleeve portion rotatably supported on said first mentioned shaft and a portion extending outwardly between said coupling turbine and impeller, a one-way brake between said rotatable housing and said ground member for preventing reverse rotation of said converter reaction member with respect to said rotatable housing and for permitting forward rotation of said converter reaction member with respect to said housing, a one-way brake between said sun gear extension and said rotatable housing for preventing reverse rotation of said sun gear with respect to said rotatable housing and for permitting forward rotation of said sun gear with respect to said housing, an engageable and releasable clutch effective when engaged to connect said sun gear extension directly to said rotatable housing, and an engageable and releasable brake effective when engaged to prevent rotation of said rotatable housing in either a forward or reverse direction.

References Cited in the file of this patent

UNITED STATES PATENTS

| | | |
|---|---|---|
| 2,687,657 | Kugel et al. | Aug. 31, 1954 |
| 2,695,533 | Pollard | Nov. 30, 1954 |
| 2,851,906 | De Lorean | Sept. 16, 1958 |
| 2,908,190 | Hause | Oct. 13, 1959 |